United States Patent
Keeling

(10) Patent No.: US 11,997,997 B2
(45) Date of Patent: Jun. 4, 2024

(54) FISHING LINE ACCESSORY

(71) Applicant: JPK Startups, LLC, Tampa, FL (US)

(72) Inventor: Jody P. Keeling, Tampa, FL (US)

(73) Assignee: JPK STARTUPS, LLC, Tampa, FL (US)

( * ) Notice: Subject to any disclaimer, the term of this patent is extended or adjusted under 35 U.S.C. 154(b) by 0 days.

(21) Appl. No.: 17/394,858

(22) Filed: Aug. 5, 2021

(65) Prior Publication Data

US 2022/0039365 A1 Feb. 10, 2022

Related U.S. Application Data

(60) Provisional application No. 63/063,023, filed on Aug. 7, 2020.

(51) Int. Cl.
*A01K 91/03* (2006.01)
*A01K 93/00* (2006.01)
*A01K 95/00* (2006.01)

(52) U.S. Cl.
CPC .............. *A01K 91/03* (2013.01); *A01K 93/00* (2013.01); *A01K 95/00* (2013.01)

(58) Field of Classification Search
CPC ........ A01K 91/03; A01K 91/04; A01K 91/06; A01K 93/00; A01K 95/00
See application file for complete search history.

(56) References Cited

U.S. PATENT DOCUMENTS

| 3,867,783 | A | * | 2/1975 | Simpson | ................ | A01K 97/02 |
| | | | | | | 43/44.91 |
| 7,614,179 | B2 | * | 11/2009 | Kavanaugh | ............ | A01K 95/00 |
| | | | | | | 43/44.91 |
| 2016/0309691 | A1 | * | 10/2016 | Ancona | .................... | A01K 97/02 |
| 2019/0053479 | A1 | * | 2/2019 | Vergara | .................. | A01K 91/08 |

* cited by examiner

*Primary Examiner* — Joshua J Michener
*Assistant Examiner* — Henry Hooper Mudd
(74) *Attorney, Agent, or Firm* — Brian J. Colandreo; Jeffrey T. Placker; Holland & Knight LLP

(57) ABSTRACT

A fishing line accessory includes: a body assembly including a slot for receiving a fishing line without requiring that the fishing line be cut; and at least one toolless retention assembly for releasably affixing the fishing line within the slot; wherein the slot and the at least one toolless retention assembly are configured to allow the body assembly to longitudinally slide along the fishing line.

22 Claims, 5 Drawing Sheets

FISHING LINE ACCESSORY

RELATED APPLICATION(S)

This application claims the benefit of U.S. Provisional Application No. 63/063,023, filed on 7 Aug. 2020, the entire contents of which are incorporated herein by reference.

TECHNICAL FIELD

This disclosure relates to fishing line accessories and, more particularly, to fishing line accessories that can be attached without damaging the fishing line.

BACKGROUND

Many devices are attached to fishing lines such as sinkers or floats (also known as bobbers). It is common for a fisherman to change one or more of these devices during the course of a fishing trip to account for changing environmental conditions or adapting to the conditions by using different fishing methods to target the same or different species of fish. Fishing floats, bobbers and similar structures and devices that are attachable to fishing lines have been known for many years. Earlier designs were simple floating structures to which a line could be tethered by tying a knot. Later came the development of the slip-type float in which the fishing line was threaded through a permanent opening in a buoyant body, which allowed the line to slip with respect to the buoyant body in a desired manner. Because of certain limitations in these slip-type floats, efforts were made to improve upon the earlier models, to add greater versatility, and to provide easier, and simpler ways to attach a fishing line to a slip-type floating device, and to remove it therefrom as required. Other related innovations allow for a bobber to be attached to the main fishing line using a clip or other fixing devices. Other recent innovations also allow a weight or bobber to be fixed to the main fishing line using a peg or other similar device to pin the main fishing line against the side of the weight or bobber.

Such prior efforts do not allow the user to attach the bobber or sinker to the line without cutting it and give the user the option to secure the floating body to a fishing line at a set point or distance from the hook, giving the buoyant body both aspects and capabilities of slip-type float or a fixed position float interchangeably, while also maintaining the ability to quickly attach or remove such device without cutting the fishing line. The clip devices are quite difficult and tricky to use and often times they leave significant kinks in the line when the bobber is removed which then needs to be re-tied (defeating the purpose of not having to cut the line in the first place). The peg devices are often difficult to attach to the line when using heavier line. Likewise, when using smaller line, often times the line gets pulled out of the device leaving the device detached from the main line itself.

The earliest fishing sinkers were either clamped or tied securely to a fishing line. To change the weight on a fishing line, a fisherman would have to cut the line and add a new weight. Since then, several systems have addressed the issue of removability. These systems, although removable, have presented other limitations by either requiring the use of tools or otherwise being cumbersome to deal with under typical fishing conditions. Likewise, such devices do not allow the user to interchangeably switch between sliding freely on the line or being fixed at a specific spot on the line, while also allowing the device to be attached or removed from the line without cutting the fishing line.

SUMMARY OF DISCLOSURE

In one implementation, a fishing line accessory includes: a body assembly including a slot for receiving a fishing line without requiring that the fishing line be cut; and at least one toolless retention assembly for releasably affixing the fishing line within the slot; wherein the slot and the at least one toolless retention assembly are configured to allow the body assembly to longitudinally slide along the fishing line.

One or more of the following features may be included. The body assembly may include one or more of: a sinker body assembly; a float body assembly; and a planer body assembly. The sinker body assembly may have a density greater than water. The float body assembly may have a density less than water. The planer body assembly may be configured to maintain a portion of the fishing line a desired distance away form a boat. The at least one toolless retention assembly may include: a first toolless retention assembly positioned at a first distal end of the body assembly; and a second toolless retention assembly positioned at a second distal end of the body assembly. The at least one toolless retention assembly may include: a nonlinear passage through which the fishing line may pass upon being manipulated in at least two axes. The slot may be configured to allow the fishing line to travel in the z-axis and the nonlinear passage of the at least one toolless retention assembly may require the fishing line to be manipulated in the z-axis plus the x-axis and/or the y-axis in order to enter the slot. A line locking assembly may be configured to affix the fishing line accessory to the fishing line to prevent longitudinal movement of the fishing line accessory along the fishing line. The line locking assembly may include: a locking trough configured to snuggly receive a portion of the fishing line and releasably affix the fishing line to the fishing line accessory, thus preventing longitudinal movement of the fishing line accessory along the fishing line. The slot may be configured to allow the fishing line to travel in the z-axis and the locking trough may require the fishing line to be manipulated in the x-axis and/or the y-axis in order to prevent longitudinal movement of the fishing line accessory along the fishing line. The line locking assembly may include: a pinning assembly configured to be snuggly received in the slot to releasably affix the fishing line to the slot, thus preventing longitudinal movement of the fishing line accessory along the fishing line. The pinning assembly may include: a plug assembly configured to be received in a distal end of the slot.

In another implementation, a fishing line accessory includes: a body assembly including a slot for receiving a fishing line without requiring that the fishing line be cut, wherein the body assembly includes one or more of: a sinker body assembly, a float body assembly and a planer body assembly; and at least one toolless retention assembly for releasably affixing the fishing line within the slot including a nonlinear passage through which the fishing line may pass upon being manipulated in at least two axes; wherein the slot and the at least one toolless retention assembly are configured to allow the body assembly to longitudinally slide along the fishing line.

One or more of the following features may be included. The sinker body assembly may have a density greater than water. The float body assembly may have a density less than water. The planer body assembly may be configured to maintain a portion of the fishing line a desired distance away form a boat. The at least one toolless retention assembly may include: a first toolless retention assembly positioned at a first distal end of the body assembly; and a second toolless retention assembly positioned at a second distal end of the body assembly.

In another implementation, a fishing line accessory includes: a body assembly including a slot for receiving a fishing line without requiring that the fishing line be cut; at least one toolless retention assembly for releasably affixing the fishing line within the slot including a nonlinear passage through which the fishing line may pass upon being manipulated in at least two axes; and a line locking assembly configured to affix the fishing line accessory to the fishing line to prevent longitudinal movement of the fishing line accessory along the fishing line.

One or more of the following features may be included. The line locking assembly may include: a locking trough configured to snuggly receive a portion of the fishing line and releasably affix the fishing line to the fishing line accessory, thus preventing longitudinal movement of the fishing line accessory along the fishing line. The slot may be configured to allow the fishing line to travel in the z-axis and the locking trough may require the fishing line to be manipulated in the x-axis and/or the y-axis in order to prevent longitudinal movement of the fishing line accessory along the fishing line. The line locking assembly may include: a pinning assembly configured to be snuggly received in the slot to releasably affix the fishing line to the to the slot, thus preventing longitudinal movement of the fishing line accessory along the fishing line. The pinning assembly may include: a plug assembly configured to be received in a distal end of the slot.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
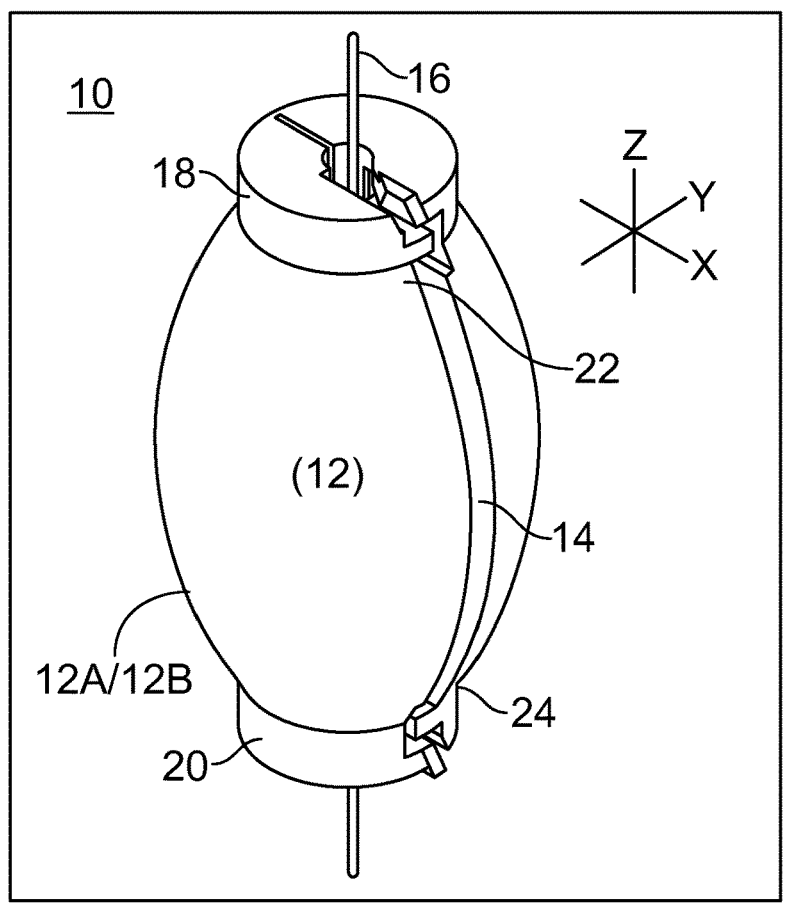
FIGS. 1-5 are diagrammatic views of a fishing line accessory according to one or more embodiments of the present disclosure.
Figure 2:
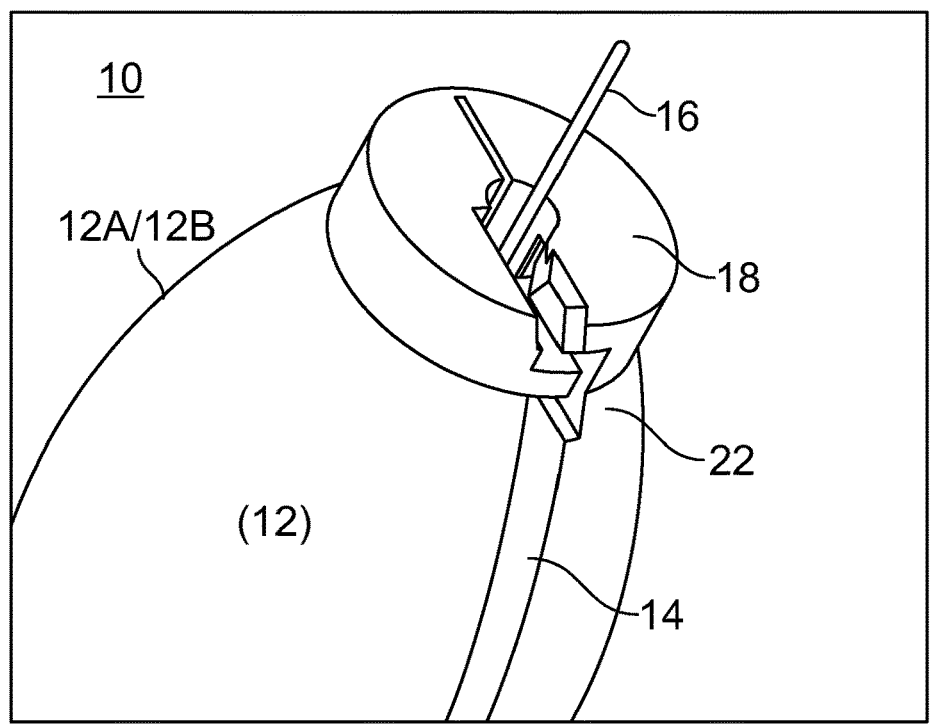
Figure 3:
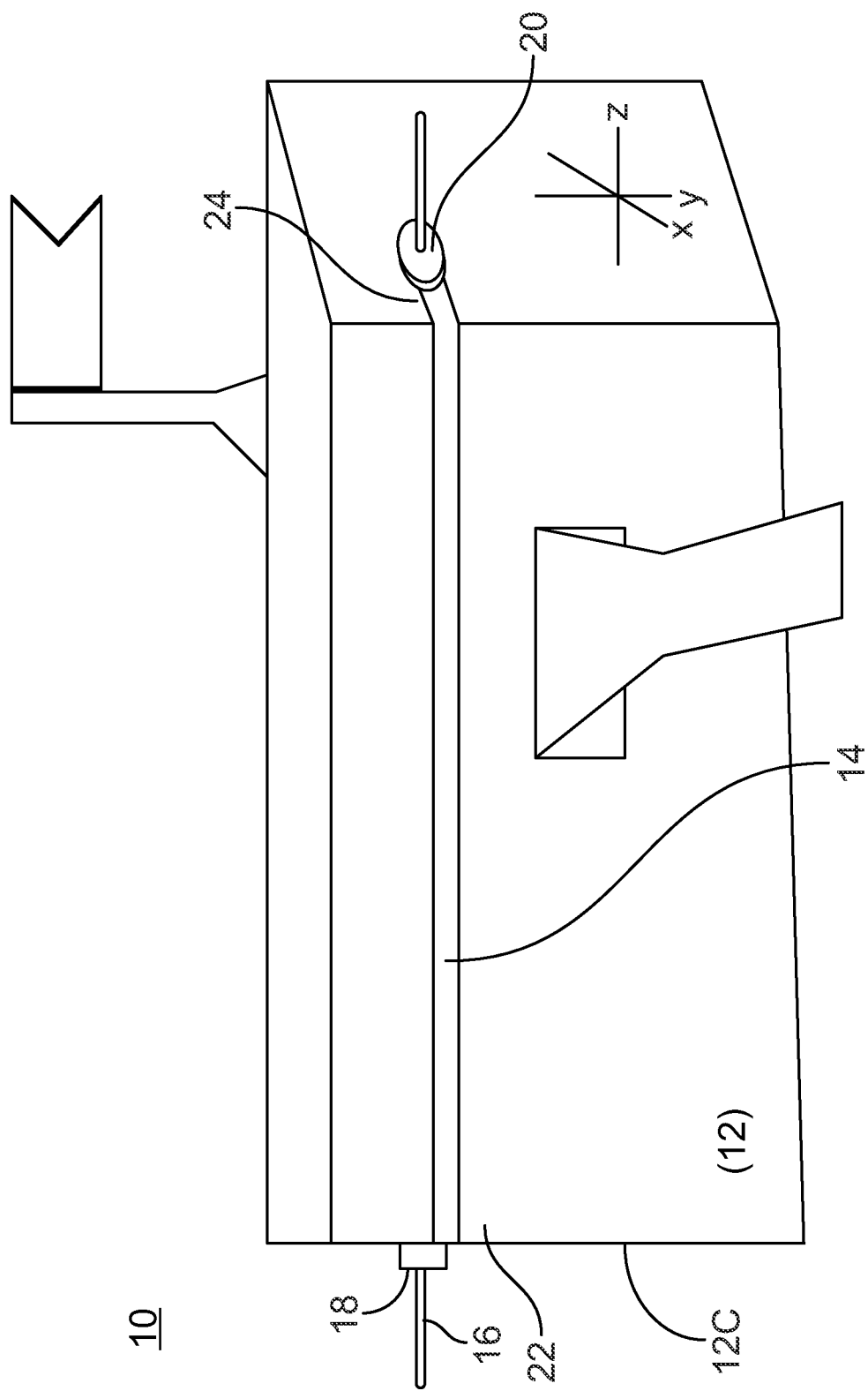
Figure 5:
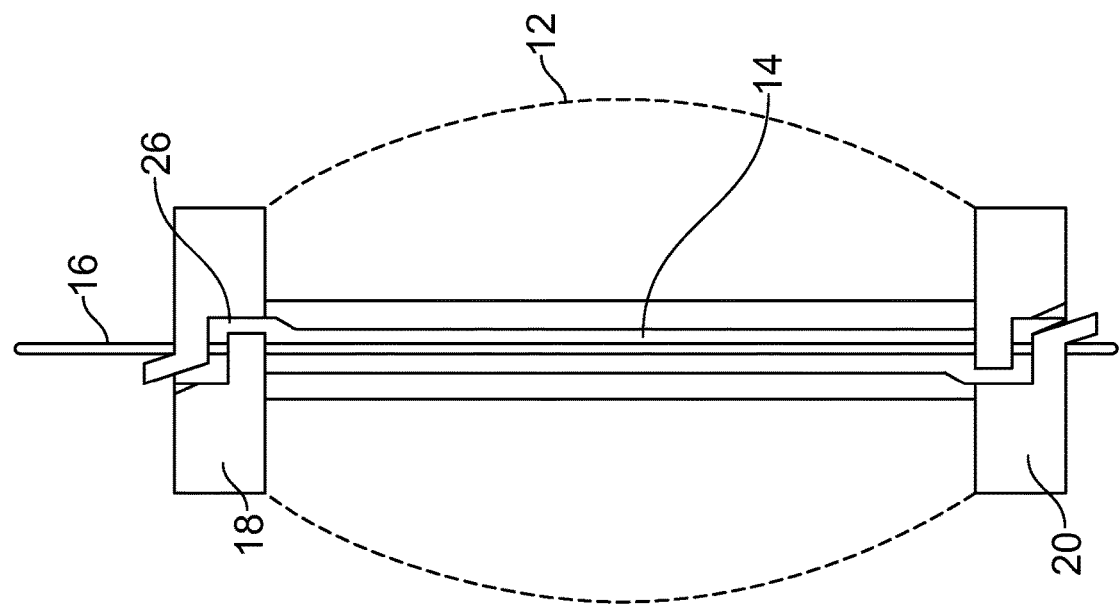
Figure 4:
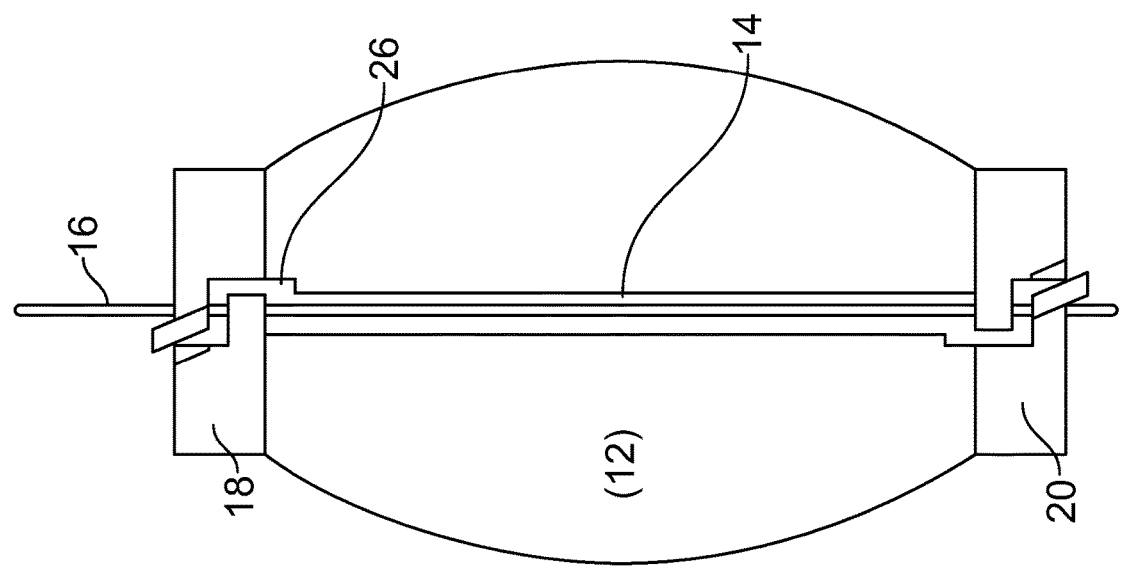
Figure 6:
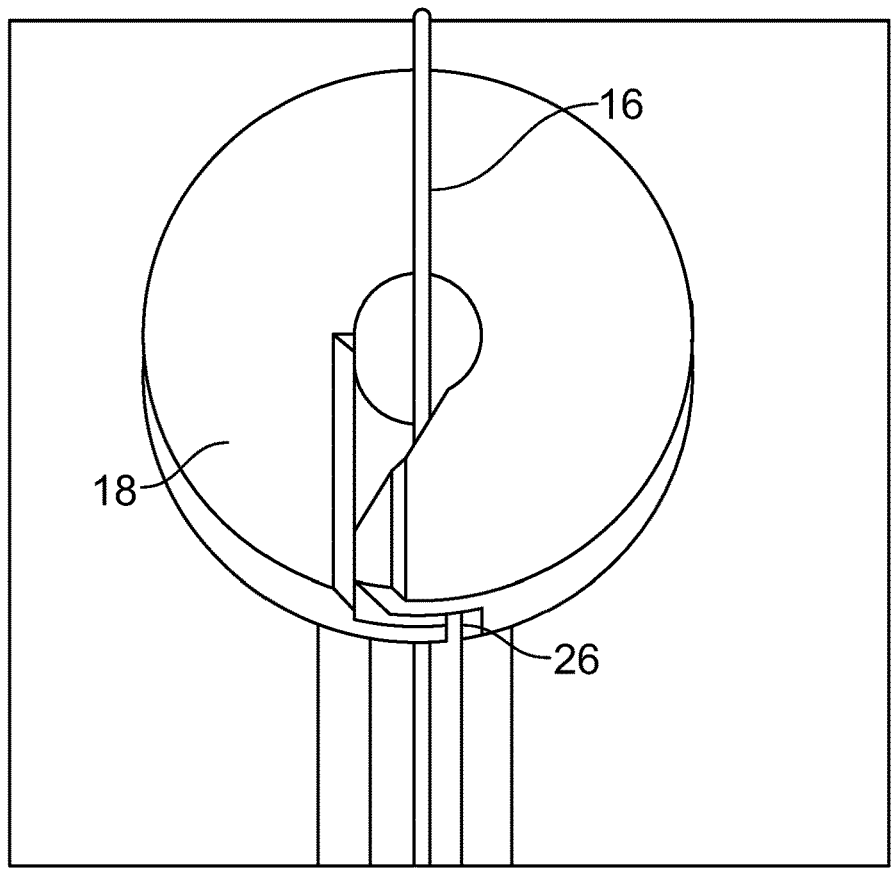
FIGS. 6-9 are diagrammatic views of a toolless retention assembly according to one or more embodiments of the present disclosure.
Figure 7:
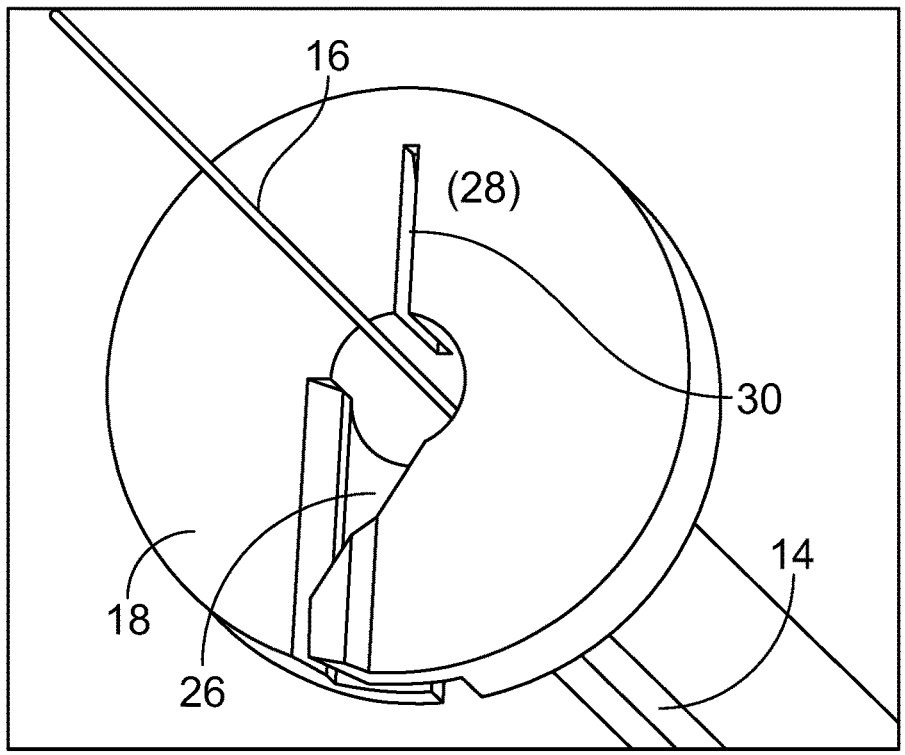

Referring to FIGS. 1-3, there is shown a fishing line accessory (e.g., fishing line accessory 10). Fishing line accessory 10 may include a body assembly (e.g., body assembly 12) having a slot (e.g., slot 14) for receiving a fishing line (e.g., fishing line 16) without requiring that the fishing line (e.g., fishing line 16) be cut. Fishing line accessory 10 may include at least one toolless retention assembly (e.g., toolless retention assembly 18, 20) for releasably affixing the fishing line (e.g., fishing line 16) within the slot (e.g., slot 14).

The slot (e.g., slot 14) and the at least one toolless retention assembly (e.g., toolless retention assembly 18, 20) may be configured to allow the body assembly (e.g., body assembly 12) to longitudinally slide along the fishing line (e.g., fishing line 16). For example, body assembly 12 may longitudinally slide along fishing line 16 with respect to the z-axis. Examples of the body assembly (e.g., body assembly 12) may include one or more of: a sinker body assembly (e.g., sinker body assembly 12A), as shown in FIGS. 1 & 2; a float body assembly (e.g., float body assembly 12B), as shown in FIGS. 1 & 2; and a planer body assembly (e.g., planer body assembly 12C), as shown in FIG. 3.

The sinker body assembly (e.g., sinker body assembly 12A) may have a density greater than water (e.g., 997 $kg/m^3$), thus resulting in the fishing line accessory (e.g., fishing line accessory 10) sinking in water. Accordingly and in such a configuration, sinker body assembly may be constructed of a high density material, examples of which may include but are not limited to: lead, high-density plastics, aluminum, and tungsten. As is known in the art, a fishing sinker is a sinker used in conjunction with a fishing lure or hook to increase its rate of sink, anchoring ability, and/or casting distance. Fishing sinkers may be as small as 1 gram for applications in shallow water, and even smaller for fly fishing applications, or as large as several pounds or considerably more for deep sea fishing. They may be formed into nearly innumerable shapes for diverse fishing applications.

The float body assembly (e.g., float body assembly 12B) may have a density less than water (e.g., 997 $kg/m^3$), thus resulting in the fishing line accessory (e.g., fishing line accessory 10) floating in water. Accordingly, float body assembly 12B may be constructed of low density material, examples of which may include but are not limited to closed-cell extruded polystyrene foam or low-density plastic). As is known in the art, a fishing float (or bobber in the US) is an item of angling equipment. Usually attached to a fishing line, it may serve several purposes. Firstly, it may suspend the bait at a predetermined depth; secondly, due to its buoyancy, it may carry the baited hook to otherwise inaccessible areas of water by allowing the float to drift in the prevailing current; and thirdly, a float may serve as a visual bite indicator.

The planer body assembly (e.g., planer body assembly 12C) may be configured to maintain a portion of the fishing line (e.g., fishing line 16) a desired distance away form a boat. As is known in the art, a planer is a floating device which (through use of an angled leading edge) pulls a fishing line away from the port or starboard side of a moving boat, while planning on top of the water. Most planers are made of plastic or foam (enabling them to float) and have some type of keel weight to provide stability.

The at least one toolless retention assembly (e.g., toolless retention assembly 18, 20) may include: a first toolless retention assembly (e.g., toolless retention assembly 18) positioned at a first distal end (e.g., first distal end 22) of the body assembly (e.g., body assembly 12). Additionally, the at least one toolless retention assembly (e.g., toolless retention assembly 18, 20) may include: a second toolless retention assembly (e.g., toolless retention assembly 20) positioned at a second distal end (e.g., second distal end 24) of the body assembly (e.g., body assembly 12). In such a configuration, the fishing line (e.g., fishing line 16) may be releasably held within the slot (e.g., slot 14) at both distal ends (e.g., distal ends 22, 24) of the body assembly (e.g., body assembly 12).

Figure 8:
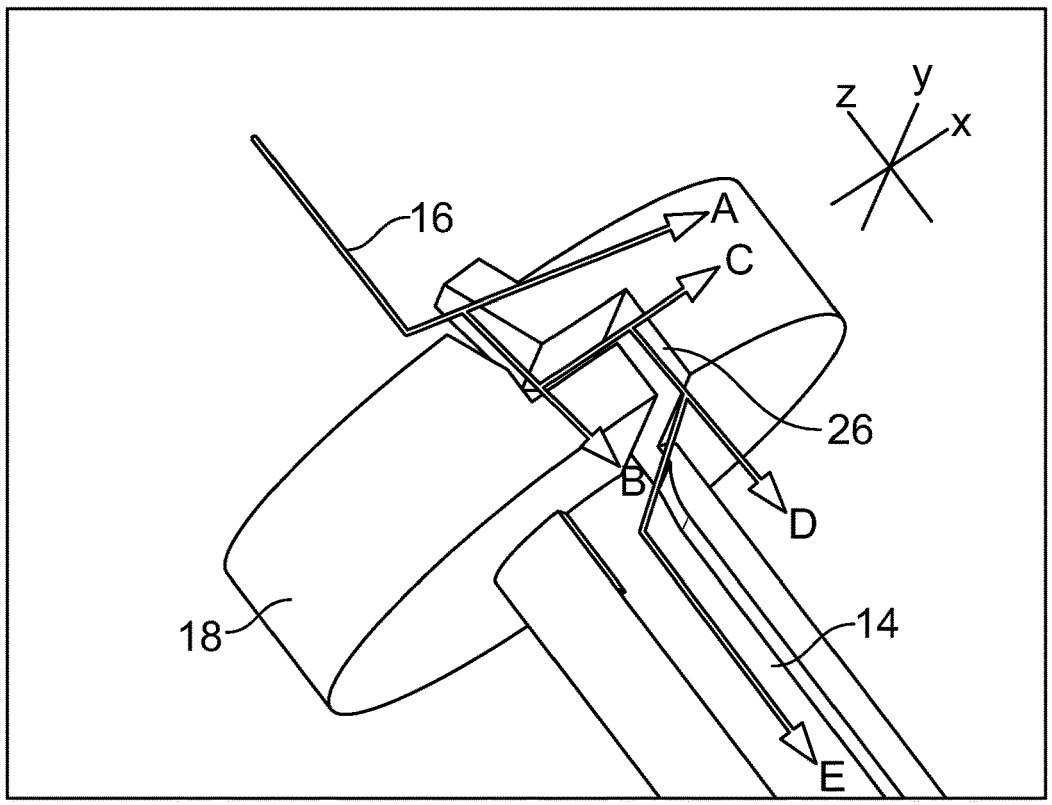

Referring also to FIGS. 4-9, the at least one toolless retention assembly (e.g., toolless retention assembly 18, 20) may include: a nonlinear passage (e.g., nonlinear passage 26) through which the fishing line (e.g., fishing line 16) may pass upon being manipulated in at least two axes. For example, the slot (e.g., slot 14) may be configured to allow the fishing line (e.g., fishing line 16) to travel in the z-axis and the nonlinear passage (e.g., nonlinear passage 26) of the at least one toolless retention assembly (e.g., toolless retention assembly 18, 20) may require the fishing line (e.g., fishing line 16) to be manipulated in the z-axis (e.g., the direction of travel of fishing line 16 within slot 14) plus the x-axis and/or the y-axis in order to enter the slot (e.g., slot 14). Accordingly, a user of fishing line accessory 10 may manipulate fishing line 16 (e.g., bending fishing line 16 left/right/forward/backward, as shown in FIG. 8) in order to get fishing line 16 to pass through nonlinear passage 26 and enter the slot (e.g., slot 14). For example, the user of fishing line accessory 10 may pull fishing line 16 in the direction of Arrow A→then Arrow B→then Arrow C→then Arrow D→then Arrow E, resulting in fishing line 16 passing through nonlinear passage 26 and entering slot 14. Once fishing line 16 passes through nonlinear passage 26 and enters slot 14, fishing line 16 will return to its normal shape (e.g., straight) and will not pass through nonlinear passage 26 without being again manipulated by the user of fishing line accessory 10. Accordingly, the at least one toolless retention assembly (e.g., toolless retention assembly 18, 20) may be configured to allow fishing line 16 to be manipulated so that it will pass through nonlinear passage 26 to enter slot 14, where it will remain until fishing line 16 is once again manipulated to remove the fishing line 16 from slot 14 via nonlinear passage 26.

As discussed above, the slot (e.g., slot 14) and the at least one toolless retention assembly (e.g., toolless retention assembly 18, 20) may be configured to allow the body assembly (e.g., body assembly 12) to longitudinally slide (e.g., in the z-axis) along the fishing line (e.g., fishing line 16). However, it may be desirable to lock the body assembly (e.g., body assembly 12) to the fishing line (e.g., fishing line 16) to prevent any longitudinal movement (e.g., in the z-axis) along the fishing line (e.g., fishing line 16). Accordingly, fishing line accessory 10 may include a line locking assembly (e.g., line locking assembly 28) configured to affix the fishing line accessory (e.g., fishing line accessory 10) to the fishing line (e.g., fishing line 16), thus preventing longitudinal movement (e.g., in the z-axis) of the fishing line accessory (e.g., fishing line accessory 10) along the fishing line (e.g., fishing line 16).

Figure 9:
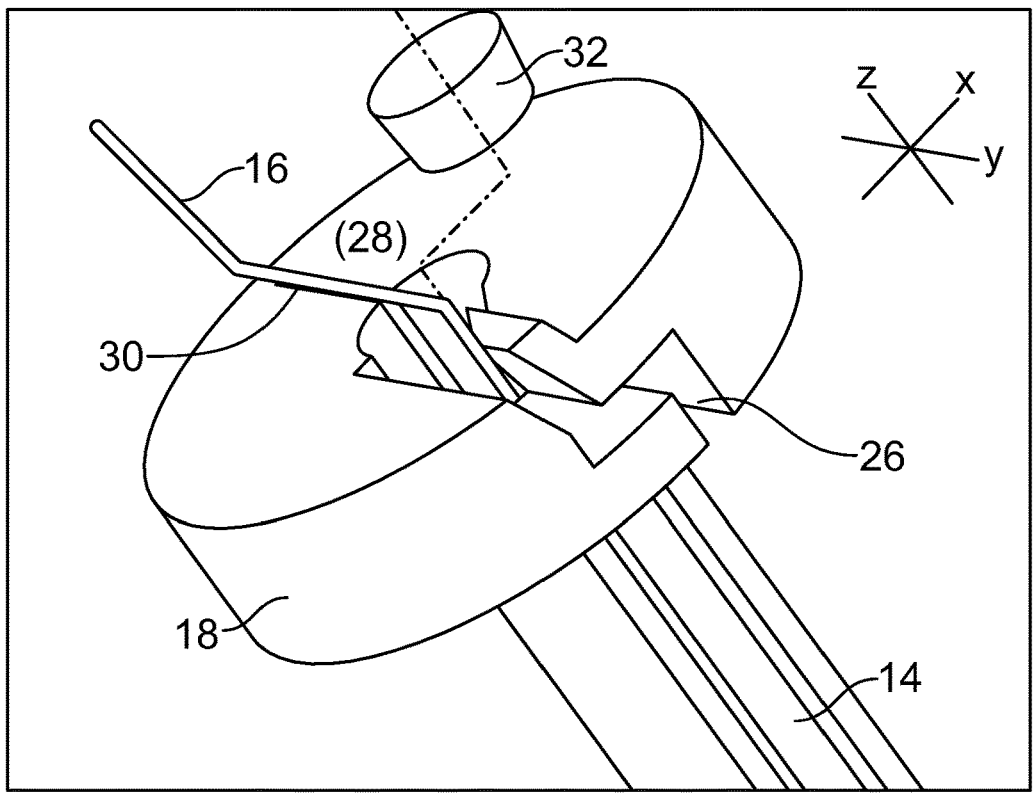

The line locking assembly (e.g., line locking assembly 28) may include: a locking trough (e.g., locking trough 30) configured to snuggly receive a portion of the fishing line (e.g., fishing line 16) so that it releasably affixes the fishing line (e.g., fishing line 16) to the fishing line accessory (e.g., fishing line accessory 10), thus preventing longitudinal movement (e.g., in the z-axis) of the fishing line accessory (e.g., fishing line accessory 10) along the fishing line (e.g., fishing line 16). For example, locking trough 30 may be slightly narrower than the diameter of fishing line 16, thus resulting in an interference fit between fishing line 16 and locking trough 30. As discussed above, the slot (e.g., slot 14) may be configured to allow the fishing line (e.g., fishing line 16) to travel in the z-axis. The locking trough (e.g., locking trough 30) may require the fishing line (e.g., fishing line 16) to be manipulated in the x-axis and/or the y-axis in order to prevent longitudinal movement (e.g., in the z-axis) of the fishing line accessory (e.g., fishing line accessory 10) along the fishing line (e.g., fishing line 16). For example, the fishing line (e.g., fishing line 16) may be bent upon exiting the slot (e.g., slot 14) and wedged into locking trough 30 (e.g., as shown in FIG. 9), thus preventing longitudinal movement (e.g., in the z-axis) of the fishing line accessory (e.g., fishing line accessory 10) along the fishing line (e.g., fishing line 16). In the event that longitudinal movement of the fishing line accessory (e.g., fishing line accessory 10) along the fishing line (e.g., fishing line 16) is again desired in the future, the fishing line (e.g., fishing line 16) may be pulled out of the locking trough (e.g., locking trough 30).

In the event that a more resilient fixation is needed, the line locking assembly (e.g., line locking assembly 28) may include: a pinning assembly (e.g., pinning assembly 32) configured to be snuggly received in the slot (e.g., slot 14) to releasably affix the fishing line (e.g., fishing line 16) to the slot (e.g., slot 14), thus preventing longitudinal movement (e.g., in the z-axis) of the fishing line accessory (e.g., fishing line accessory 10) along the fishing line (e.g., fishing line 16). Specifically, the pinning assembly (e.g., pinning assembly 32) may include (i.e., be configured as): a plug assembly configured to be received in a distal end (e.g., distal end 22) of the slot (e.g., slot 14). For example, the pinning assembly (e.g., pinning assembly 32) may be pressed into the end of slot 14 (in a fashion similar to the manner in which a stopper is pressed into the end of a test tube) to provide a more robust fixation of fishing line 16 to slot 14.

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A fishing line accessory comprising:
   a body assembly including a slot for receiving a fishing line without requiring that the fishing line be cut; and
   at least one toolless retention assembly positioned at a first distal end of the body assembly for releasably affixing the fishing line within the slot, wherein the toolless retention assembly includes a nonlinear passage through which the fishing line may pass upon being manipulated in at least two axes, wherein the nonlinear passage is defined by at least a first portion extending in a first direction from a first side of the slot and generally transverse to the slot and a second portion extending in a second direction from a second side of the slot and generally transverse to the slot, wherein the second direction is generally opposed to the first direction such that the first portion and the second portion each cross a centerline of the slot and at least partially overlap to define at least a portion of the nonlinear passage, wherein the first portion and the second portion are adjacent to the first distal end of the body assembly;

wherein the slot and the at least one toolless retention assembly are configured to allow the body assembly to longitudinally slide along the fishing line.

2. The fishing line accessory of claim 1 wherein the body assembly includes one or more of:
   a sinker body assembly;
   a float body assembly; and
   a planer body assembly.

3. The fishing line accessory of claim 2 wherein the sinker body assembly has a density greater than water.

4. The fishing line accessory of claim 2 wherein the float body assembly has a density less than water.

5. The fishing line accessory of claim 2 wherein the planer body assembly is configured to maintain a portion of the fishing line a desired distance away from a boat.

6. The fishing line accessory of claim 1 wherein the at least one toolless retention assembly includes:
   a first toolless retention assembly positioned at the first distal end of the body assembly; and
   a second toolless retention assembly positioned at a second distal end of the body assembly.

7. The fishing line accessory of claim 1 wherein the slot is configured to allow the fishing line to travel in the z-axis and the nonlinear passage of the at least one toolless retention assembly requires the fishing line to be manipulated in the z-axis plus the x-axis and/or the y-axis in order to enter the slot.

8. The fishing line accessory of claim 1 further comprising:
   a line locking assembly configured to affix the fishing line accessory to the fishing line to prevent longitudinal movement of the fishing line accessory along the fishing line.

9. The fishing line accessory of claim 8 wherein the line locking assembly includes:
   a locking trough configured to snuggly receive a portion of the fishing line and releasably affix the fishing line to the fishing line accessory, thus preventing longitudinal movement of the fishing line accessory along the fishing line.

10. The fishing line accessory of claim 9 wherein the slot is configured to allow the fishing line to travel in the z-axis and the locking trough requires the fishing line to be manipulated in the x-axis and/or the y-axis in order to prevent longitudinal movement of the fishing line accessory along the fishing line.

11. The fishing line accessory of claim 8 wherein the line locking assembly includes:
    a pinning assembly configured to be snuggly received in the slot to releasably affix the fishing line to the slot, thus preventing longitudinal movement of the fishing line accessory along the fishing line.

12. The fishing line accessory of claim 11 wherein the pinning assembly includes:
    a plug assembly configured to be received in a distal end of the slot.

13. A fishing line accessory comprising:
    a body assembly including a slot for receiving a fishing line without requiring that the fishing line be cut, wherein the body assembly includes one or more of: a sinker body assembly, a float body assembly and a planer body assembly; and
    at least one toolless retention assembly positioned at a first distal end of the body assembly for releasably affixing the fishing line within the slot including a nonlinear passage through which the fishing line may pass upon being manipulated in at least two axes, wherein the nonlinear passage is defined by at least a first portion extending in a first direction from a first side of the slot and generally transverse to the slot and a second portion extending in a second direction from a second side of the slot and generally transverse to the slot, wherein the second direction is generally opposed to the first direction such that the first portion and the second portion each cross a centerline of the slot and at least partially overlap to define at least a portion of the nonlinear passage, wherein the first portion and the second portion are adjacent to the first distal end of the body assembly;
    wherein the slot and the at least one toolless retention assembly are configured to allow the body assembly to longitudinally slide along the fishing line.

14. The fishing line accessory of claim 13 wherein the sinker body assembly has a density greater than water.

15. The fishing line accessory of claim 13 wherein the float body assembly has a density less than water.

16. The fishing line accessory of claim 13 wherein the planer body assembly is configured to maintain a portion of the fishing line a desired distance away from a boat.

17. The fishing line accessory of claim 13 wherein the at least one toolless retention assembly includes:
    a first toolless retention assembly positioned at the first distal end of the body assembly; and
    a second toolless retention assembly positioned at a second distal end of the body assembly.

18. A fishing line accessory comprising:
    a body assembly including a slot for receiving a fishing line without requiring that the fishing line be cut;
    at least one toolless retention assembly positioned at a first distal end of the body assembly for releasably affixing the fishing line within the slot including a nonlinear passage through which the fishing line may pass upon being manipulated in at least two axes, wherein the nonlinear passage is defined by at least a first portion extending in a first direction from a first side of the slot and generally transverse to the slot and a second portion extending in a second direction from a second side of the slot and generally transverse to the slot, wherein the second direction is generally opposed to the first direction such that the first portion and the second portion each cross a centerline of the slot and at least partially overlap to define at least a portion of the nonlinear passage, where the first portion and the second portion are adjacent to the first distal end of the body assembly; and
    a line locking assembly configured to affix the fishing line accessory to the fishing line to prevent longitudinal movement of the fishing line accessory along the fishing line.

19. The fishing line accessory of claim 18 wherein the line locking assembly includes:
    a locking trough configured to snuggly receive a portion of the fishing line and releasably affix the fishing line to the fishing line accessory, thus preventing longitudinal movement of the fishing line accessory along the fishing line.

20. The fishing line accessory of claim 19 wherein the slot is configured to allow the fishing line to travel in the z-axis and the locking trough requires the fishing line to be manipulated in the x-axis and/or the y-axis in order to prevent longitudinal movement of the fishing line accessory along the fishing line.

21. The fishing line accessory of claim 18 wherein the line locking assembly includes:
a pinning assembly configured to be snuggly received in the slot to releasably affix the fishing line to the slot, thus preventing longitudinal movement of the fishing line accessory along the fishing line.

22. The fishing line accessory of claim 21 wherein the pinning assembly includes:
a plug assembly configured to be received in a distal end of the slot.

* * * * *